United States Patent
Menafro

(10) Patent No.: US 11,774,316 B2
(45) Date of Patent: Oct. 3, 2023

(54) APPARATUS FOR CARRYING OUT LOAD TESTING ON AN AIRCRAFT PART AND METHOD THEREOF

(71) Applicant: LEONARDO S.P.A., Rome (IT)

(72) Inventor: Felice Menafro, Bacoli (IT)

(73) Assignee: LEONARDO S.P.A., Rome (IT)

( * ) Notice: Subject to any disclaimer, the term of this patent is extended or adjusted under 35 U.S.C. 154(b) by 48 days.

(21) Appl. No.: 17/626,408

(22) PCT Filed: Jul. 16, 2020

(86) PCT No.: PCT/IB2020/056691
§ 371 (c)(1),
(2) Date: Jan. 11, 2022

(87) PCT Pub. No.: WO2021/009703
PCT Pub. Date: Jan. 21, 2021

(65) Prior Publication Data
US 2022/0260450 A1    Aug. 18, 2022

(30) Foreign Application Priority Data
Jul. 16, 2019  (IT) .......................... 102019000011850

(51) Int. Cl.
*G01M 5/00* (2006.01)
*G01B 11/14* (2006.01)

(52) U.S. Cl.
CPC ........... *G01M 5/0016* (2013.01); *G01B 11/14* (2013.01)

(58) Field of Classification Search
CPC ...... G01M 5/0016; G01M 7/022; G01M 7/06; G01B 11/14
See application file for complete search history.

(56) References Cited

U.S. PATENT DOCUMENTS

| 2017/0268958 A1 | 9/2017 | Basham et al. |
| 2019/0094104 A1 | 3/2019 | Penn et al. |
| 2020/0337630 A1* | 10/2020 | Earthman ............... G01N 3/317 |

FOREIGN PATENT DOCUMENTS

| EP | 2741068 A1 * | 6/2014 | .......... G01M 5/0016 |
| EP | 2741068 A1 | 6/2014 | |

OTHER PUBLICATIONS

International Search Report, issued in PCT/IB2020/056691, dated Nov. 6, 2020, Rijswijk, NL.

* cited by examiner

*Primary Examiner* — Natalie Huls
*Assistant Examiner* — Cynthia L Davis
(74) *Attorney, Agent, or Firm* — ArentFox Schiff LLP; Michael Fainberg

(57) ABSTRACT

An apparatus for carrying out load testing on an aircraft part is described. In one aspect, the apparatus includes means for constraining the aircraft part and a linear actuator for applying a test load. The linear actuator has a first part being tiltable and being pivotally constrained about a first and a second geometrical axes, orthogonal to one another, and a second part being slidably mounted on the first part to slide along a longitudinal direction. A load cell, mounted on the second part, measures force acting on the aircraft part along the longitudinal direction. In one aspect, a first clinometer and a second clinometer are mounted on the linear actuator, each clinometer measuring a respective angle representative of rotation of the linear actuator respectively about the first and second geometrical axes. A displacement transducer measures sliding of the second part relative to the first part of the linear actuator.

10 Claims, 5 Drawing Sheets

APPARATUS FOR CARRYING OUT LOAD TESTING ON AN AIRCRAFT PART AND METHOD THEREOF

CROSS-REFERENCE TO RELATED APPLICATIONS

This application is a National Phase Application of PCT International Application No. PCT/IB2020/056691, having an International Filing Date of Jul. 16, 2020 which claims priority to Italian Application No. 102019000011850 filed Jul. 16, 2019, each of which is hereby incorporated by reference in its entirety.

FIELD OF THE INVENTION

The present invention generally relates to an apparatus for carrying out load testing on an aircraft part, such as for example a wing, an elevator, a fuselage section or a tailplane.

BACKGROUND OF THE INVENTION

Before it may be used in the construction of an aircraft, each aircraft part (for example a wing, a tailplane, a fuselage section, a moving surface such as a wing or an elevator) must undergo load tests specific to the certification of the part. These load tests mainly comprise static structural tests, which allow the real elastic performance of the part in the various flight configurations to be established, and structural fatigue tests, which allow the useful life of the part subjected to repeated operational stress cycles to be verified.

Apparatuses and methods of use of such apparatuses adapted to carry out load testing and obtain data useful for certification by means of position transducers, configured to measure the deformation of the stressed part, and load cells, configured to measure the stress imposed on the part, are generally known. Known apparatuses for load testing are disclosed in EP 2,741,068 A1, US 2017/268958 A1 and US 2019/094104 A1.

With reference to the increasingly stringent tolerance margins required in the design of aircraft parts, the weight-saving capacity, and thus the reduction of costs, is strictly connected to the accuracy with which the aforesaid load tests may be completed.

SUMMARY OF THE INVENTION

The object of the present invention is therefore to improve the reliability and precision of the load tests necessary for the certification of airline parts.

This and other objects are fully achieved by an apparatus and a method for carrying out load testing on an aircraft part as described and claimed herein.

Advantageous embodiments of the present invention are also described.

In short, the invention is based on the idea of providing an apparatus for carrying out load tests on an aircraft part, the apparatus comprising:

constraint means adapted to constrain the aircraft part;
at least one linear actuator configured to apply a test load to the aircraft part, the linear actuator comprising
a tiltable, first part, pivotally constrained at one end thereof about at least a first and a second geometrical axis, orthogonal to one another, and
a second part, slidably mounted on the first part to slide relative thereto along a longitudinal direction;
a load cell, mounted on the second part of the linear actuator and interposed between the latter and the aircraft part to measure a force acting on the aircraft part along said longitudinal direction;
a first and a second clinometer, mounted on the linear actuator, each adapted to measure a respective angle representative of the rotation of the linear actuator about the first and second geometric axes respectively;
a displacement transducer, mounted on the first part of the linear actuator, and adapted to measure the sliding of the second part of the linear actuator relative to the first part of the linear actuator.

By virtue of such a configuration of the apparatus for carrying out load tests, it is possible to improve the overall accuracy of the load tests.

Advantageously, the first and second clinometers are mounted on the linear actuator in positions having an angular distance of approximately 90° between them.

BRIEF DESCRIPTION OF THE DRAWINGS

Further features and advantages of the present invention will become clearer from the detailed description that follows, given purely by way of non-limiting example with reference to the accompanying drawings, wherein.

DETAILED DESCRIPTION

Figure 1:
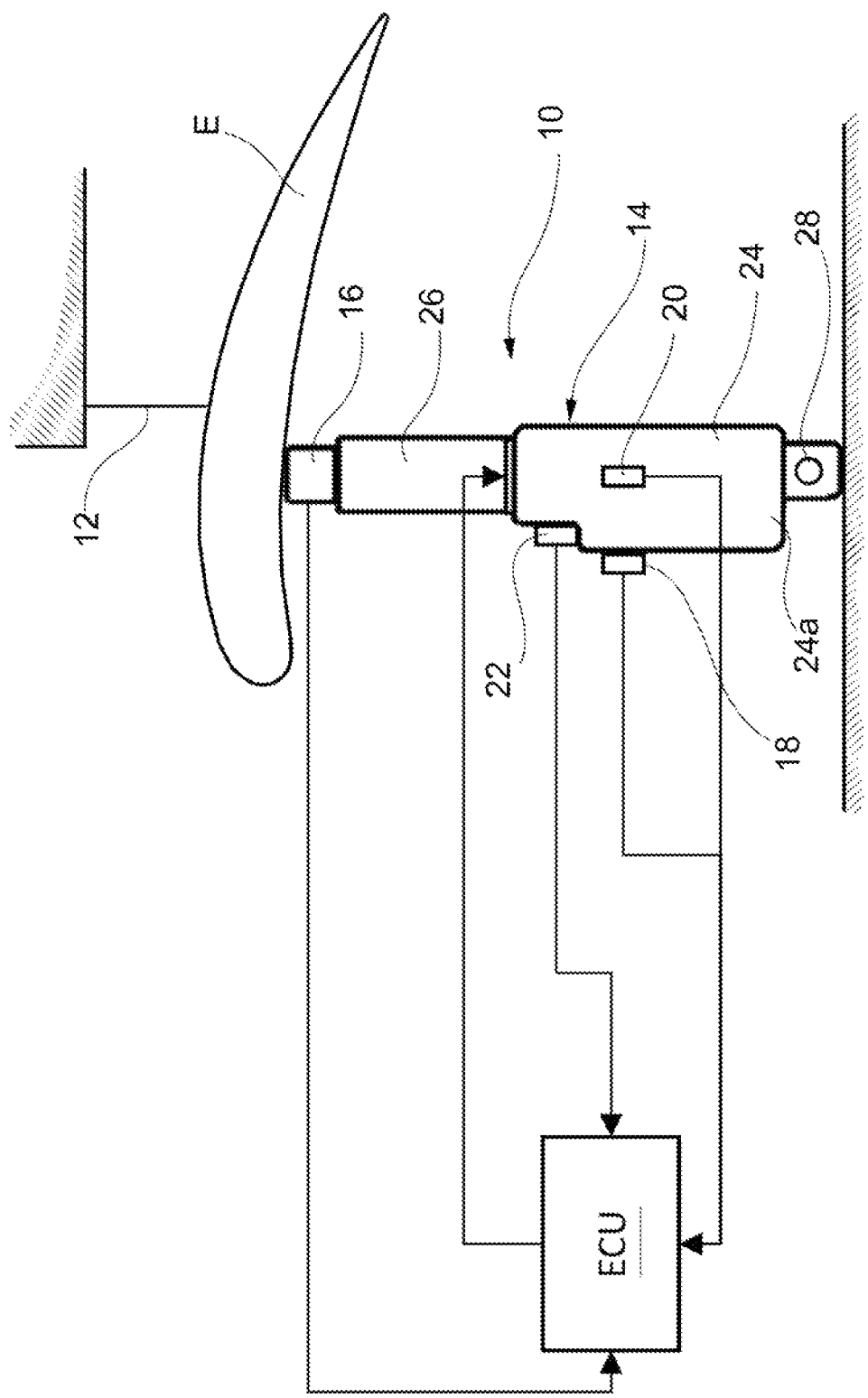
FIG. 1 is a schematic view of an apparatus for carrying out load tests on an aircraft part according to the invention.
Figure 2:
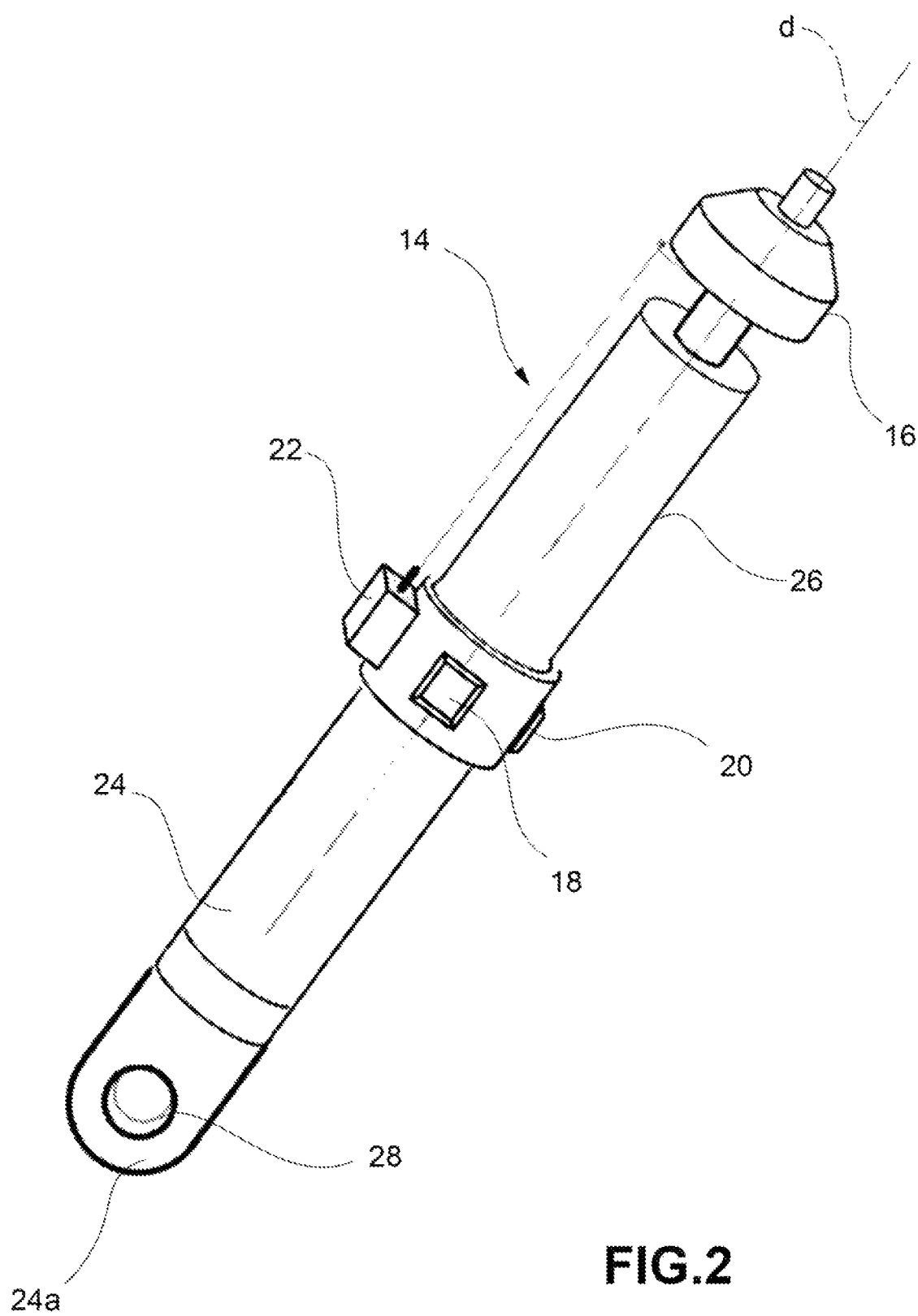
FIGS. 2 and 3 are perspective views of a linear actuator of the apparatus of FIG. 1.
Figure 3:
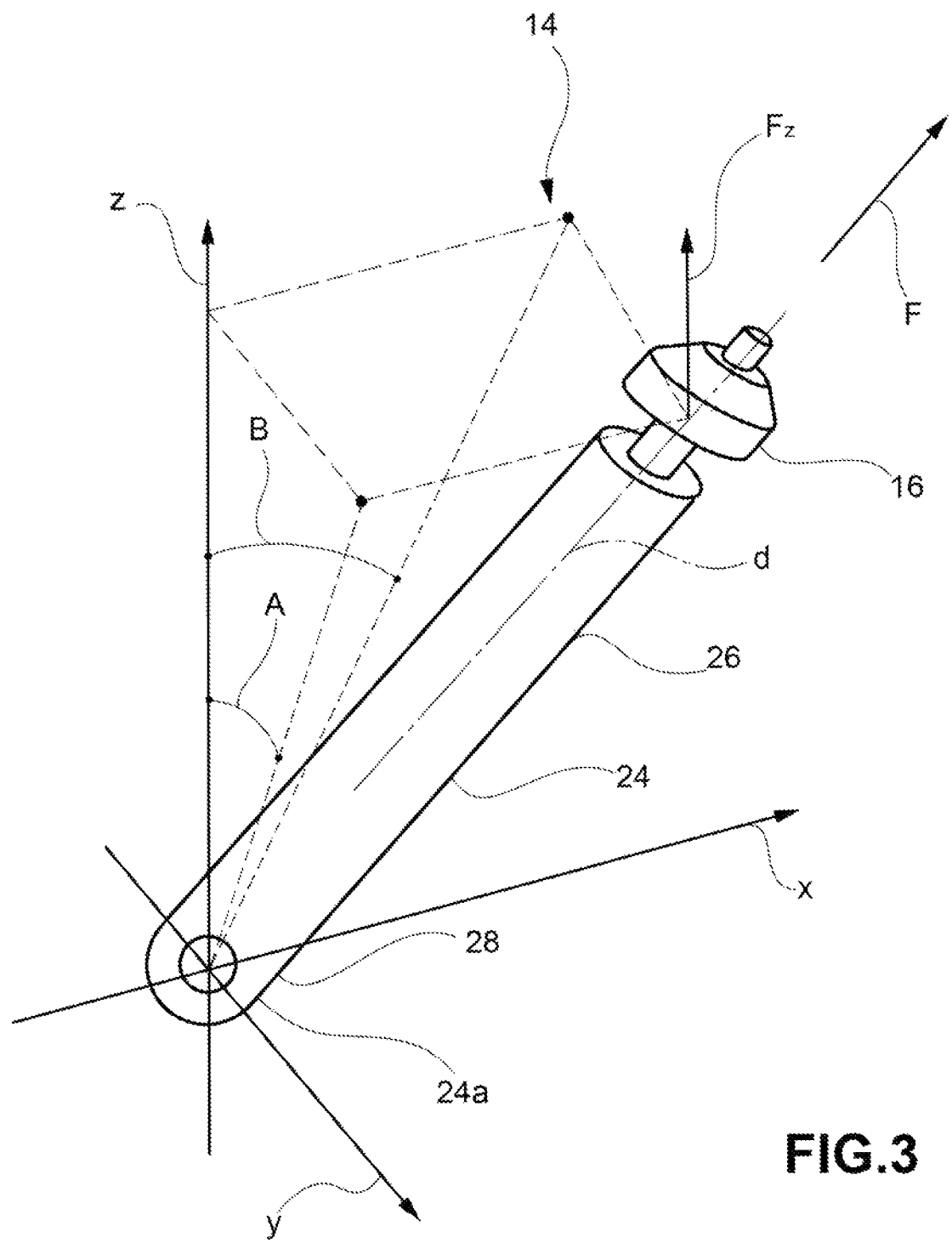

With reference initially to FIGS. 1 to 3, an apparatus for carrying out load tests on an aircraft part E according to the invention is indicated as a whole at 10.

The apparatus 10 essentially comprises constraint means 12, a linear actuator 14, a load cell 16, a first and a second clinometer 18 and 20, and a displacement transducer 22.

The constraint means 12 are represented in FIG. 1 only schematically, and are adapted to constrain the aircraft part E and to keep it stationary during the execution of the load tests. In particular, purely by way of non-limiting example, when the aircraft part E subjected to the load tests is a wing, the constraint means 12 used are such that the wing is inserted at the wing root thereof.

As mentioned above, the apparatus comprises a linear actuator 14. More generally, the apparatus 10 may comprise a plurality of linear actuators 14, each adapted to apply a test load TL in a different point of application of the aircraft part E. For simplicity, in the present description and in the appended claims, embodiments of the apparatus 10 which comprise a single linear actuator 14 will be described, it being understood that the number of linear actuators 14 and the related parts mounted thereon may be modified according to the specific requirements of the load test to be performed, and that these modifications are within the scope of the invention.

In a manner known per se, the linear actuator 14 comprises two parts: in particular, a non-extensible first part 24, and a second part 26, slidably mounted on the first part 24 to slide relative thereto along a longitudinal extension direction d of the linear actuator 14. The first part 24 of the linear actuator 14 is mounted tiltable; in particular, it is pivotally constrained at one of its ends 24a, for example by means of connection to an articulated joint 28, about a first geometrical axis x and about a second geometrical axis y, orthogonal to one another.

On the second part 26 of the linear actuator 14, and interposed between the linear actuator 14 and the aircraft part E, there is a load cell 16. The load cell 16 is configured to measure a force F acting on the aircraft part E directed along the longitudinal extension direction d of the linear actuator 14.

Furthermore, the two clinometers are arranged on the linear actuator 14, in particular the first clinometer 18 and the second clinometer 20. The first and the second clinometer 18 and 20 are each adapted to measure, respectively, an angle A and an angle B, representative of the rotation of the linear actuator 14, respectively, about the first geometrical axis x and the second geometrical axis y. In particular, as shown in FIG. 2, the first and second clinometers 18 and 20 are preferably arranged at the same coordinate along the longitudinal direction d and in positions having between them an angular distance about the longitudinal direction d of approximately 90°. Clearly, it is always possible to use a greater number of clinometers, for redundancy or to improve the accuracy of the measurement, for example a first plurality of clinometers arranged as the first clinometer 18 and a second plurality of clinometers arranged as the second clinometer 20, or to arrange the clinometers at different coordinates along the longitudinal direction d, or at different angular distances about the longitudinal direction d: in fact, in any event, by knowing the mounting position of the first and second clinometers 18 and 20, it is always possible, starting from the measurements thereof, to calculate the angles of rotation about the first geometrical axis x and the second geometrical axis y. Initially, the linear actuator 14 is arranged orthogonal to the common plane of position of the first geometrical axis x and the second geometrical axis y, so that the longitudinal direction d of the linear actuator 14 is orthogonal to the first geometrical axis x and the second geometrical axis y, and therefore lies along a third geometrical axis z, orthogonal to the first geometrical axis x and the second geometrical axis y. While carrying out the load test, the linear actuator 14 extends along the longitudinal direction d and may tilt with respect to the common plane of position of the first geometrical axis x and the second geometrical axis y, whereby the first and second clinometers 18 and 20 may measure the tilt angles with respect to said plane of position.

On the linear actuator 14, in particular on the first part 24 of the linear actuator 14, a displacement transducer 22 is also adapted to measure the sliding of the second part 26 of the linear actuator 14 relative to the first part 24 of the linear actuator 14. Essentially, the displacement transducer 22 measures the extension of the linear actuator 14 starting from a retracted position along the longitudinal extension direction d of the linear actuator 14, and, consequently, is adapted to measure the local deformation at the point of stress of the aircraft part E subjected to load testing. Preferably, the displacement transducer 22 is an optical transducer, but clearly it may also be replaced by a sensor equivalently adapted to measure a distance.

Advantageously, the apparatus 10 further comprises an electrical control unit ECU to which respective signals are sent, the signals being representative of the measurements of the force F and of the angles A and B representative of the rotation of the linear actuator 14, as well as of the measurement performed by the displacement transducer 22. Said electronic control unit ECU is configured to control the test load TL, and, therefore, the actuation of the linear actuator 14, according to a predefined test program for the load test to be performed, and, thus for the test load TL to be applied to the aircraft part E. The predefined test program comprises indications on the use of the measurements obtained from the load cell 16, from the first and second clinometers 18 and 20, and from the displacement transducer 22, for controlling the test load TL.

Furthermore, part of the present invention is a method for carrying out said load testing on the aircraft part E.

In short, the method comprises the application of a test load TL by means of the linear actuator 14 and the measurement by the displacement transducer 22, the first and the second clinometer 18 and 20 of the deformation of the aircraft part E and of the local angles of rotation of the linear actuator 14.

More specifically, the method for carrying out load testing on an aircraft part E according to the present invention comprises the steps of:

a) constraining the aircraft part E to a fixed support;

b) preparing the linear actuator 14 as previously described for loading the aircraft part E;

c) applying, by means of said linear actuator 14, a test load TL to the aircraft part E along said longitudinal direction d;

d) obtaining, by means of the load cell 16 mounted on the second part 26 of the linear actuator 14 and interposed between the latter and the aircraft part E, a measurement of a force F acting on the aircraft part E along said longitudinal direction d;

e) obtaining, by means of the first and second clinometers 18 and 20 mounted on the linear actuator 14, a measurement of the respective angles A and B representative of the rotation of the linear actuator 14 respectively about the first and second geometrical axes x and y;

f) obtaining, by means of the displacement transducer 22 mounted on the first part 24 of the linear actuator 14, a measurement of the slide of the second part 26 of the linear actuator 14 relative to the first part 24 of the linear actuator 14.

Figure 4:
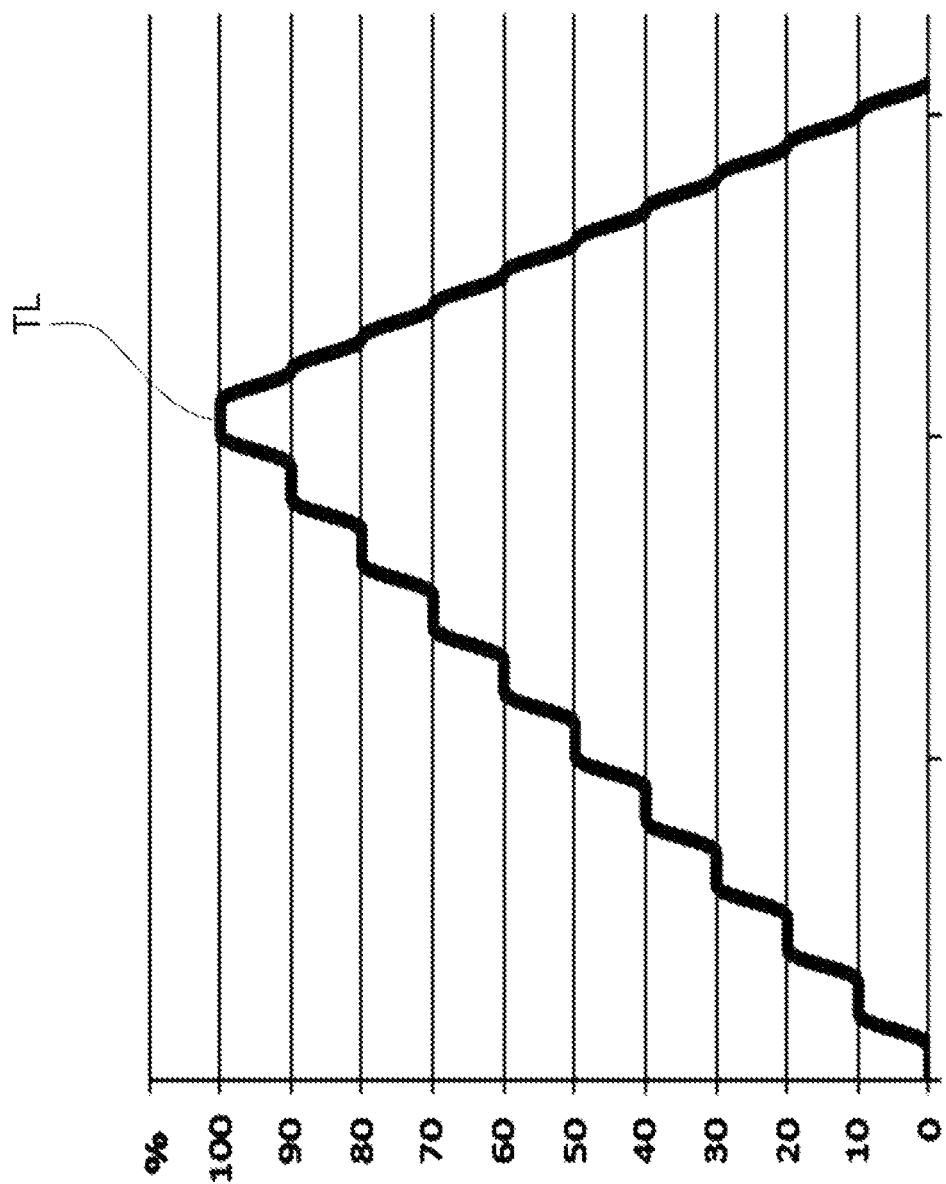
FIG. 4 is a diagram of the time profile of a test load according to a known embodiment.

FIG. 4 shows a graph of the progression of a test load TL applied according to a known method. As may be seen, generally the test load TL is varied according to a predefined time profile comprising:

a first step, wherein the applied test load TL is increased in steps from zero to approximately 100% of a predefined limit load LL, with discrete increments of the applied test load TL corresponding to approximately 5%-20% of the limit load LL each time, preferably to approximately 10% each time;

a second step, wherein the applied test load TL is kept constant;

a third step, wherein the applied test load TL is continuously reduced from approximately 100% of the limit load LL to approximately zero.

Figure 5:
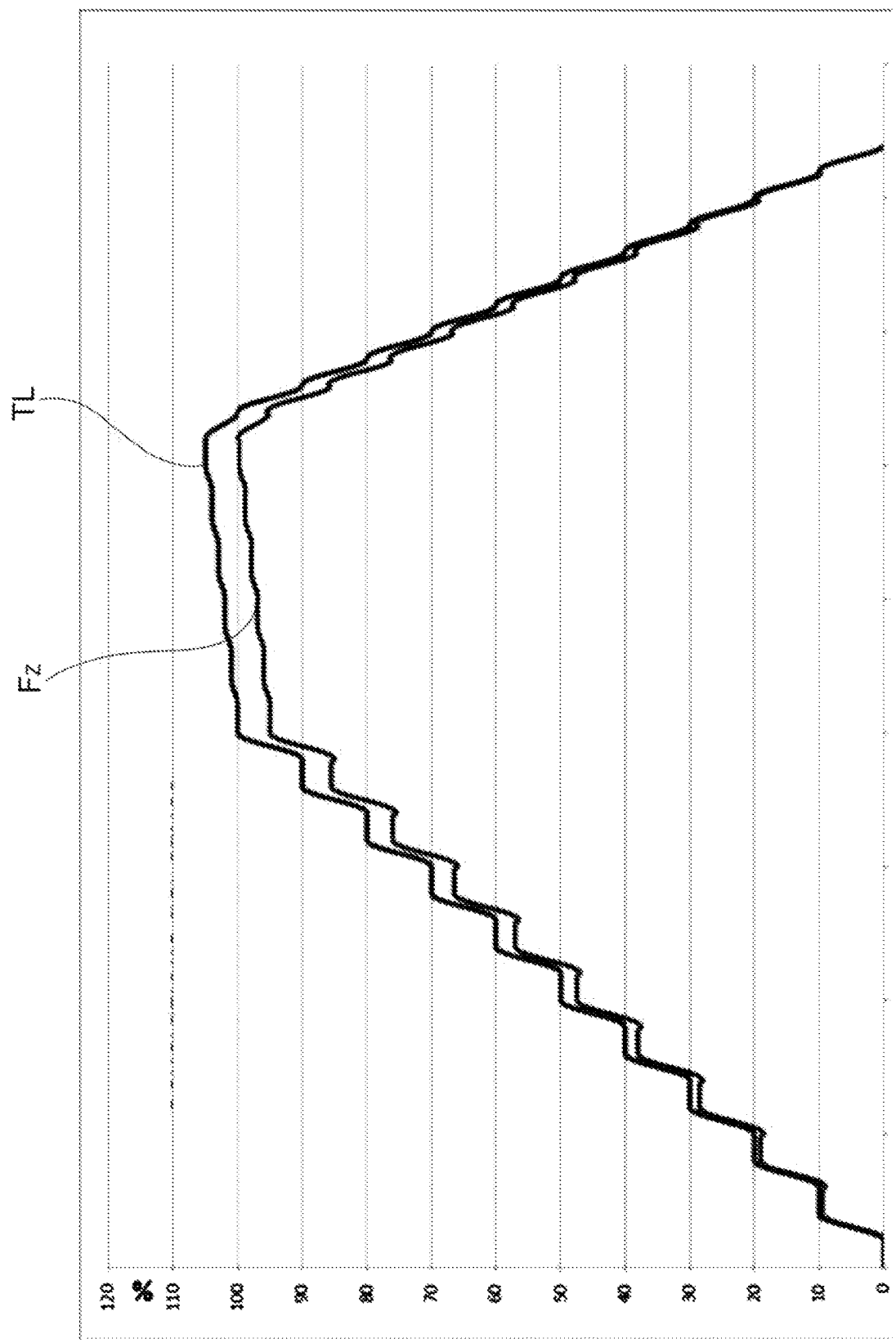
FIG. 5 is a diagram of the time profile of a test load and of the vertical part of a force measured by a load cell according to an embodiment of the method according to the invention.

Since, as shown in FIG. 3, during the load test, the linear actuator 14, starting from the initially vertical position, i.e. from the position wherein the longitudinal direction d of the linear actuator coincides with the third geometrical axis z, is free to rotate with respect to the first geometrical axis x of the angle A and with respect to the second geometrical axis y of the angle B, the vertical force component Fz, i.e. the component of the force F along the third geometrical axis z, which determines the deformation in the vertical direction (i.e. in the direction of the third geometrical axis z) of the aircraft part E under test is less than the force F transmitted by the linear actuator 14, and is in particular reduced by a multiplication factor equal to the product of the cosines of the angles A and B. Therefore, as is clearly visible in FIG. 5, when the test load TL is increased up to 100% of the limit load LL, the vertical component Fz is still less than 100% of the limit load LL. Therefore, in the method according to the invention, the test load TL is varied according to a pre-defined time profile comprising:

a first step, wherein the test load TL applied by the linear actuator 14 is increased in steps from zero to approximately 100% of the predefined limit load LL, with discrete increments of the applied test load TL corresponding to approximately 5%-20% of the limit load LL each time, preferably approximately 10% each time;

a second step, wherein the test load TL applied by the linear actuator 14 is increased in steps starting from approximately 100% of the limit load LL, with discrete increments in the applied test load TL corresponding to approximately 0.5%-2% of the limit load LL each time, preferably approximately 1% each time, up to a test load value TL applied such that the vertical component Fz of the force F measured by the load cell 16 is approximately equal to 100% of the limit load LL;

a third step wherein the test load TL applied by the linear actuator 14 is reduced starting from the value assumed at the end of the second step down to approximately zero.

Once the measurements of the first and second clinometers 18 and 20, of the displacement transducer 22 and of the load cell 16 have been obtained, it is possible to calculate the various quantities of structural interest by referring to the theory of structural mechanics in a way known per se, and using the conventional approximations for which a wing structure, for example, may be modeled, in first analysis, as a plate interlocked at the root by means of an infinitely rigid constraint.

According to another mode for carrying out a load test by means of the method according to the invention, the aforesaid second step of the process is replaced by:

a second step, wherein the test load TL applied by the linear actuator 14 is increased in steps starting from approximately 100% of the limit load LL, with discrete increments in the applied test load TL corresponding to approximately 0.5%-2% of the limit load LL each time, preferably approximately 1% each time, up to a test load value TL applied such that the vertical component Fz of the force F measured by the load cell 16, i.e. the component of the force F along the third geometrical axis z is approximately equal to 150% of the limit load LL.

Finally, according to another further mode for carrying out a load test by the method according to the invention, the second step of the process is carried out as just described, and furthermore the aforesaid third step of the process is replaced by:

a third step wherein the test load TL applied by the linear actuator 14 is increased starting from the value assumed at the end of the second step until the aircraft part E under test breaks.

Furthermore, prior to commissioning the linear actuator 14 of the apparatus 10 according to the invention, it is necessary to proceed with its calibration, and in particular with the calibration of the displacement transducer 22 and of the first and the second clinometers 18 and 20 mounted thereon, in a conventional way.

Of course, the method according to the present invention is preferably carried out making use of the apparatus 10 according to the present invention.

Naturally, it is possible to effortlessly adapt the apparatus according to the invention and the method according to the invention to carry out multi-channel load testing, wherein a plurality of linear actuators 14 is configured to stress an aircraft part E at different points of application.

As may be seen from the foregoing description, an apparatus according to the present invention and a related method allow the disadvantages of the known art to be overcome.

In particular, due to the configuration of the linear actuator and the measurement of the rotation angles of the linear actuator of the apparatus according to the present invention, it is possible to: measure the components of the force acting on the tested part along all three directions in space; more precisely quantify the internal stress quantities (bending, twisting, shearing, etc.); estimate, at the point of stress of the aircraft part, the stiffness, the deformation energy and the natural frequencies of vibration, as well as define the loads for which the structural criticalities are triggered (so-called 'buckling' load); calculate the torsion and flexion angles at the point of stress; optimize the aircraft part for floating conditions (so-called 'floating mode'); make the discretization of loads more efficient and improve the accuracy of the verification of constraint reactions.

Without prejudice to the principle of the invention, the embodiments and the details of construction may be widely varied with respect to that which has been described and illustrated purely by way of non-limiting example, without thereby departing from the scope of the invention as defined by the appended claims.

The invention claimed is:

1. An apparatus for carrying out load testing on an aircraft part, the apparatus comprising:
   a constraintor configured to constrain the aircraft part;
   a linear actuator configured to apply a test load to the aircraft part, the linear actuator comprising
      a first part, tiltable, and pivotally constrained at one end, about first and second geometrical axes (x, y), which are orthogonal to one another, and
      a second part, slidably mounted on the first part to slide relative to the first part along a longitudinal direction;
   a load cell, mounted on the second part of the linear actuator and placed between the linear actuator and the aircraft part to measure a force acting on the aircraft part along said longitudinal direction;
   a first clinometer and a second clinometer, mounted on the linear actuator, each clinometer being configured to measure a respective angle (A, B) representative of rotation of the linear actuator respectively about the first and the second geometrical axes (x, y); and
   a displacement transducer, mounted on the first part of the linear actuator, and configured to measure sliding of the second part of the linear actuator relative to the first part of the linear actuator, wherein said first clinometer, said second clinometer and said displacement transducer are mounted on the linear actuator at a same coordinate along said longitudinal direction.

2. The apparatus of claim 1, wherein said displacement transducer is an optical transducer.

3. The apparatus of claim 1, wherein said first clinometer and said second clinometer are mounted on the linear actuator at positions angularly spaced from one another by 90° about the longitudinal direction.

4. The apparatus of claim 1, wherein said apparatus further comprises an electronic control unit (ECU) configured to control the test load applied by the linear actuator based on a predefined test program.

5. The apparatus of claim 4, wherein the ECU is further configured to control the test load based on a measurement of the force carried out by the load cell.

6. The apparatus of claim 5, wherein the ECU is further configured to control the test load based on the measurement of respective angles (A, B) representative of rotation of the linear actuator respectively about the first and the second geometrical axes (x, y) carried out by the first clinometer and the second clinometer.

7. A method for carrying out load testing on an aircraft part, said method comprising:
  a) constraining an aircraft part to a fixed support;
  b) providing a linear actuator comprising
    a first part, tiltable, and pivotally constrained at one end, about a first and a second geometrical axes (x, y), which are orthogonal to one another, and
    a second part, slidably mounted on the first part to slide relative to the first part along a longitudinal direction;
  c) applying, by said linear actuator, a test load to the aircraft part along said longitudinal direction;
  d) obtaining, by a load cell mounted on the second part of the linear actuator and placed between the linear actuator and the aircraft part, a measurement of a force acting on the aircraft part along said longitudinal direction;
  e) obtaining, by a first clinometer and a second clinometer, mounted on the linear actuator, a measurement of respective angles (A, B) representative of rotation of the linear actuator respectively about the first and the second geometrical axes (x, y); and
  f) obtaining, by a displacement transducer mounted on the first part of the linear actuator, a measurement of sliding of the second part of the linear actuator relative to the first part of the linear actuator, wherein said first clinometer, said second clinometer and said displacement transducer are mounted on the linear actuator at a same coordinate along said longitudinal direction.

8. The method of claim 7, wherein the step of applying said test load is carried out according to a predefined time profile comprising:
  a first step wherein the test load applied by the linear actuator is increased in steps from zero to 100% of a predefined limit load, with discrete increments of the test load corresponding to 5%-20% of the predefined limit load each time;
  a second step wherein the test load applied to the linear actuator is increased in steps from 100% of the predefined limit load, with discrete increments of the test load corresponding to 0.5%-2% of the predefined limit load each time, until reaching an applied test load value such that a vertical component of the force measured by the load cell, that is a component of the force along a third geometrical axis (z), orthogonal to the first and the second geometrical axes (x, y), is equal to 100% of the predefined limit load; and
  a third step wherein the test load applied by the linear actuator is reduced starting from the applied test load value reached at the end of the second step until zero.

9. The method of claim 7, wherein the step of applying said test load is carried out according to a predefined time profile comprising:
  a first step wherein the test load applied by the linear actuator is increased in steps from zero to 100% of a predefined limit load, with discrete increments of the test load corresponding to 5%-20% of the predefined limit load each time;
  a second step wherein the test load applied to the linear actuator is increased in steps starting from 100% of the predefined limit load, with discrete increments of the test load corresponding to 0.5%-2% of the predefined limit load each time, until reaching an applied test load value such that a vertical component of the force measured by the load cell, that is a component of the force along a third geometrical axis (z), orthogonal to the first and the second geometrical axes (x, y), is equal to 150% of the predefined limit load; and
  a third step wherein the test load applied by the linear actuator is reduced starting from the applied test load value reached at the end of the second step until zero.

10. The method of claim 7, wherein the step of applying said test load is carried out according to a predefined time profile comprising:
  a first step wherein the test load applied by the linear actuator is increased in steps from zero to 100% of a predefined limit load, with discrete increments of the test load corresponding to 5%-20% of the predefined limit load each time;
  a second step wherein the test load applied to the linear actuator is increased in steps starting from 100% of the predefined limit load, with discrete increments of the test load corresponding to 0.5%-2% of the predefined limit load each time, until reaching an applied test load value such that a vertical component of the force measured by the load cell, that is a component of the force along a third geometrical axis (z), orthogonal to the first and the second geometrical axes (x, y), is equal to 150% of the predefined limit load; and
  a third step wherein the test load applied by the linear actuator is increased starting from the applied test load value reached at the end of the second step until the aircraft part breaks.

* * * * *